(12) United States Patent
Nakanishi

(10) Patent No.: US 11,131,223 B2
(45) Date of Patent: Sep. 28, 2021

(54) RECIRCULATION VALVE

(71) Applicant: Nidec Tosok Corporation, Zama (JP)

(72) Inventor: Tomohiko Nakanishi, Zama (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 16 days.

(21) Appl. No.: 16/815,053

(22) Filed: Mar. 11, 2020

(65) Prior Publication Data

US 2020/0300134 A1    Sep. 24, 2020

(30) Foreign Application Priority Data

Mar. 20, 2019 (JP) .............................. JP2019-053531

(51) Int. Cl.
 *F01M 13/00* (2006.01)
 *F01M 13/02* (2006.01)
 *F16K 15/02* (2006.01)

(52) U.S. Cl.
 CPC ...... *F01M 13/023* (2013.01); *F01M 13/0011* (2013.01); *F16K 15/026* (2013.01)

(58) Field of Classification Search
 CPC .... F01M 13/023; F01M 13/00; F01M 13/021; F01M 2001/1092; F16K 15/026; F16K 17/30; F16K 1/38
 See application file for complete search history.

(56) References Cited

U.S. PATENT DOCUMENTS

| | | | |
|---|---|---|---|
| 9,945,328 B2* | 4/2018 | Yoshioka | F02M 35/10209 |
| 2013/0105009 A1* | 5/2013 | Oda | F01M 13/0011 |
| | | | 137/517 |
| 2015/0040878 A1* | 2/2015 | Yoshioka | F01M 13/0011 |
| | | | 123/574 |
| 2015/0107703 A1* | 4/2015 | Yamada | G01M 3/2876 |
| | | | 137/551 |
| 2018/0051606 A1 | 2/2018 | Muramatsu | |
| 2019/0085999 A1* | 3/2019 | Chen | F16K 31/0655 |
| 2020/0300133 A1* | 9/2020 | Nakanishi | F02M 25/06 |

FOREIGN PATENT DOCUMENTS

JP        2018-028285 A      2/2018

* cited by examiner

*Primary Examiner* — John Kwon
(74) *Attorney, Agent, or Firm* — Keating & Bennett, LLP

(57) ABSTRACT

In a recirculation valve, a first support target portion receives a biasing force of a biasing member on a first stepped surface and moves to one side in an axial direction, such that a first opening is blocked. The first support target portion moves to the other side in the axial direction against a biasing force of the biasing member due to a negative pressure on a downstream side with respect to an upstream side, such that the first opening opens.

16 Claims, 13 Drawing Sheets

[Fig. 1]
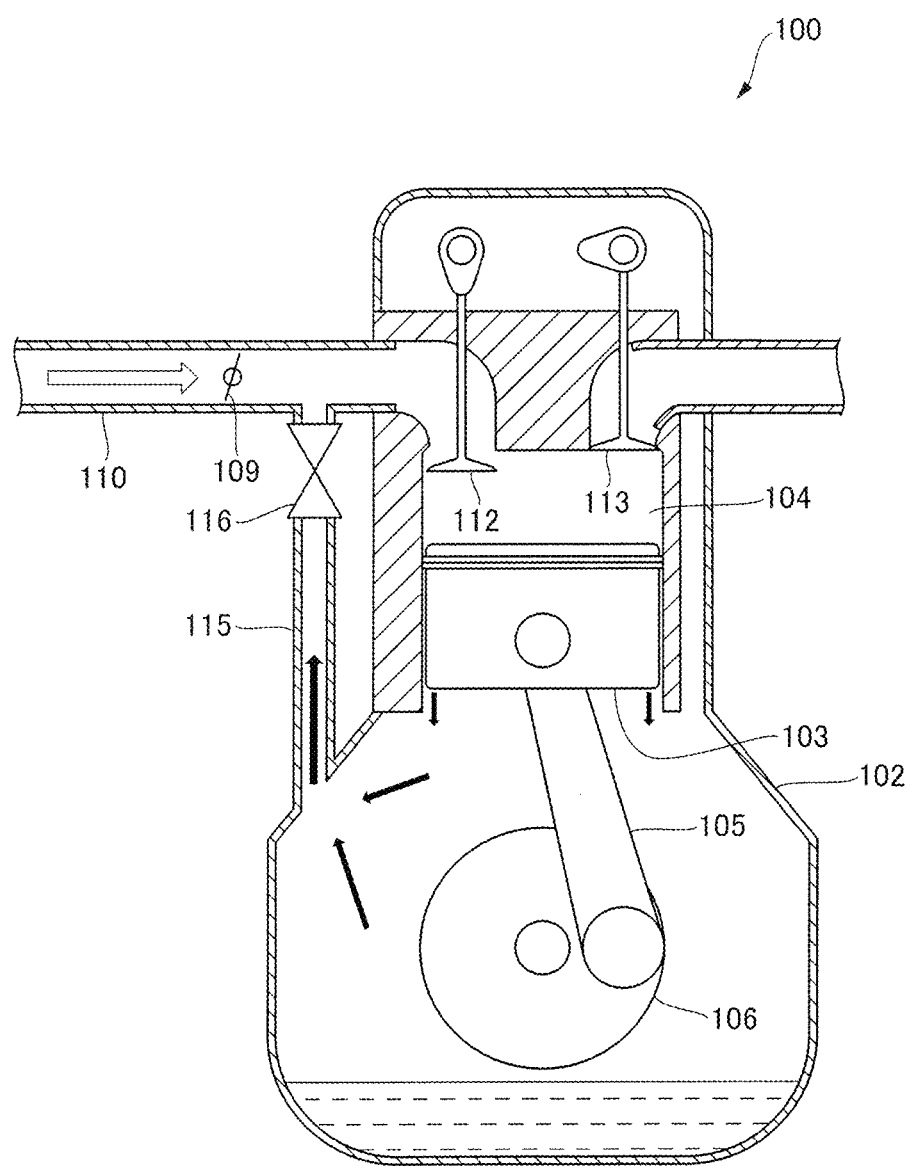

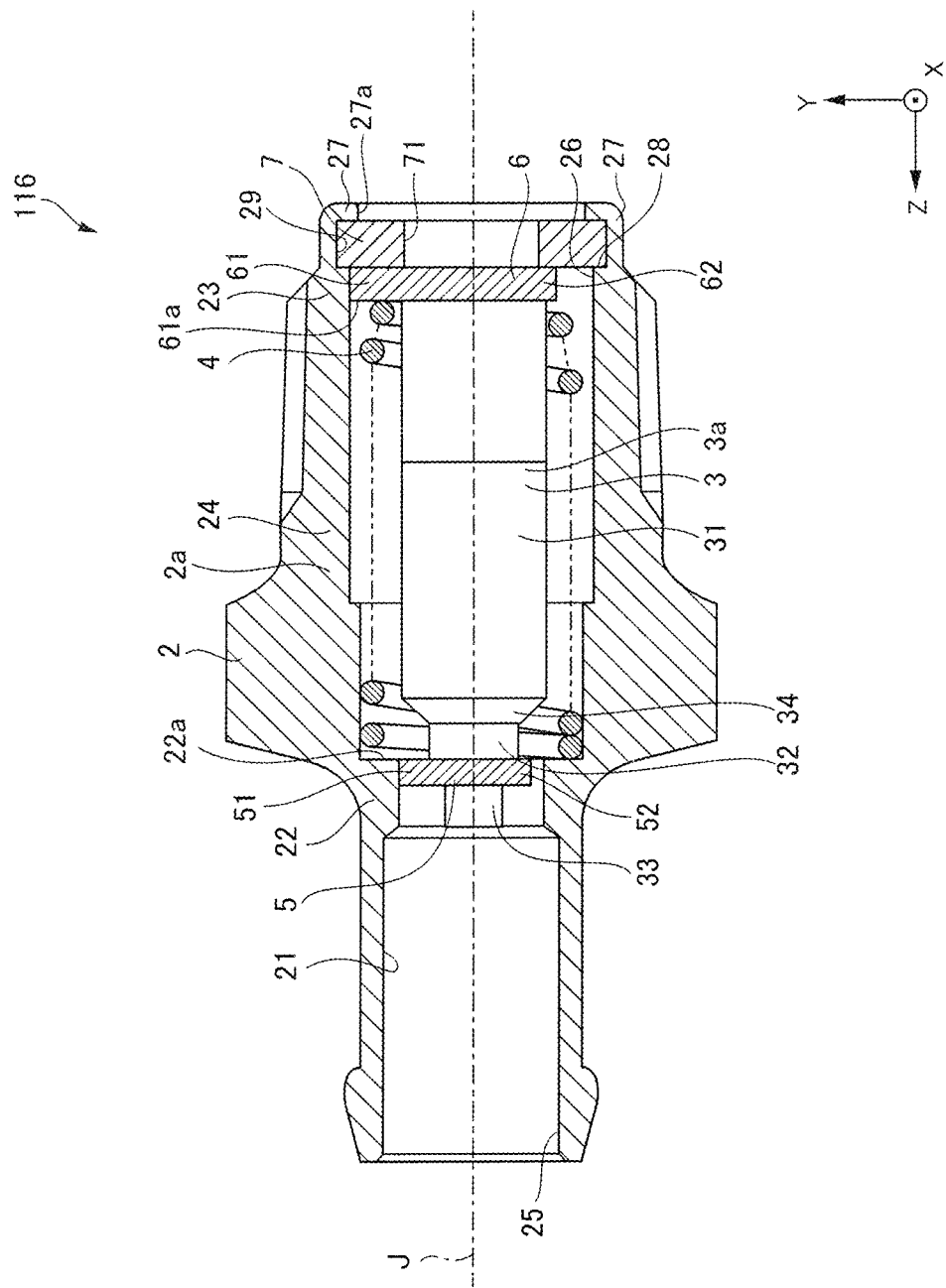
[Fig. 2]

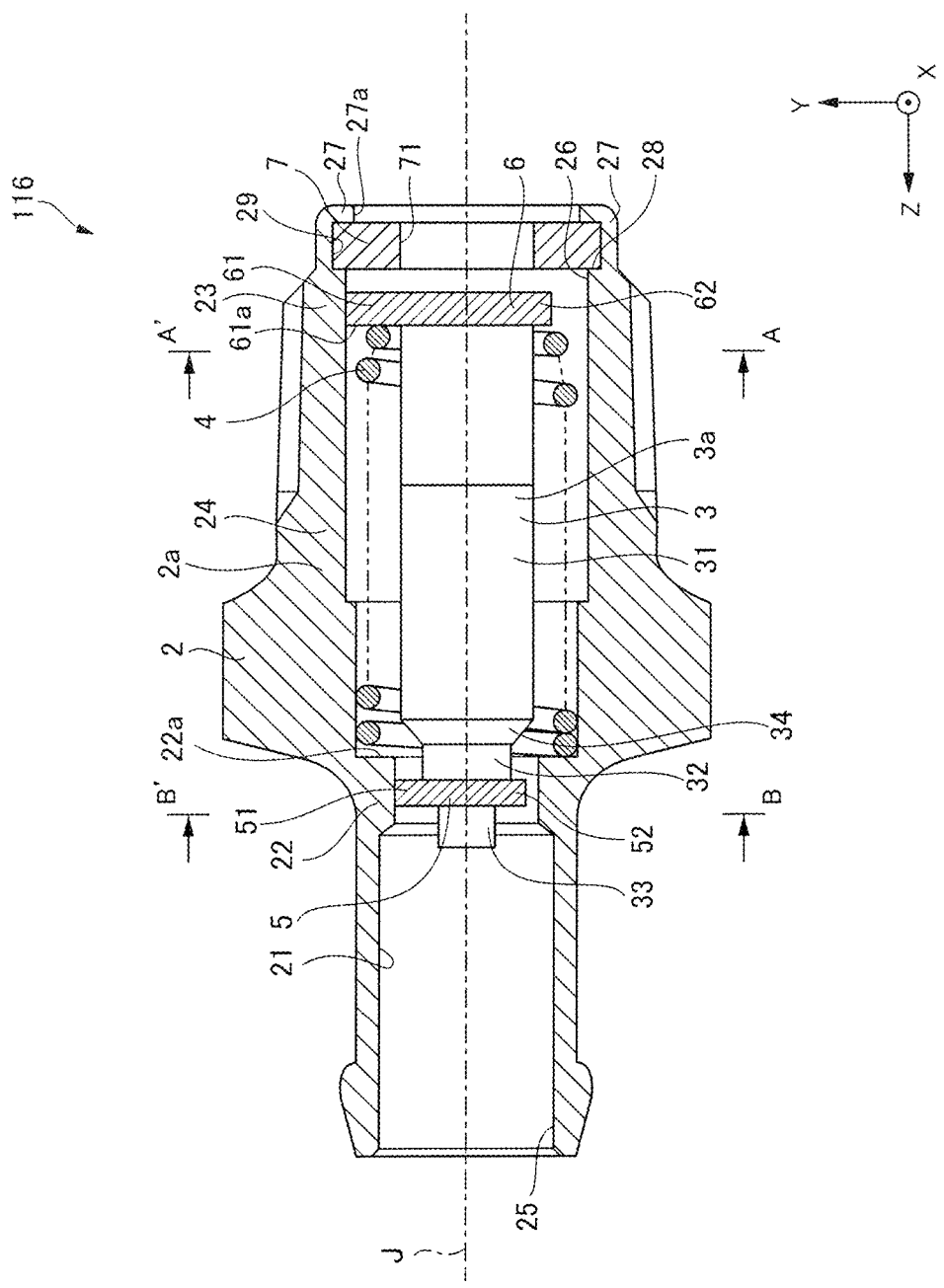
[Fig. 3]

[Fig. 4]
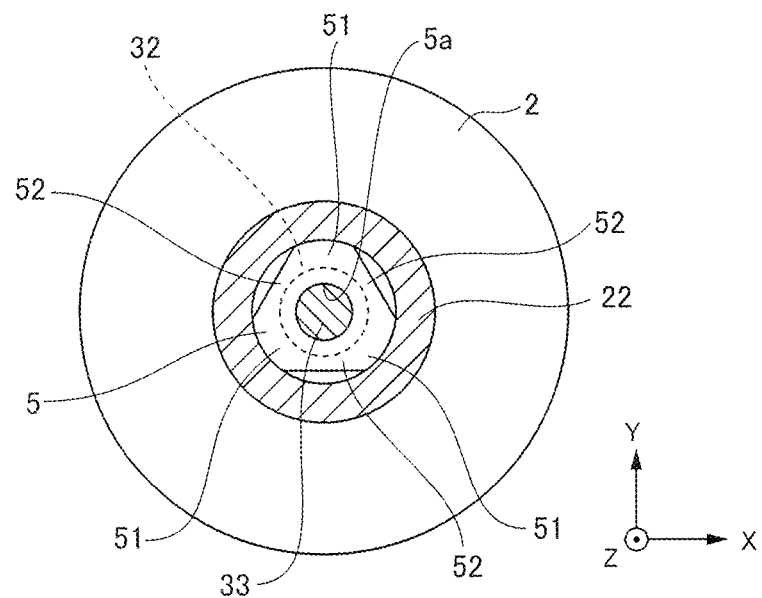
[Fig. 5]
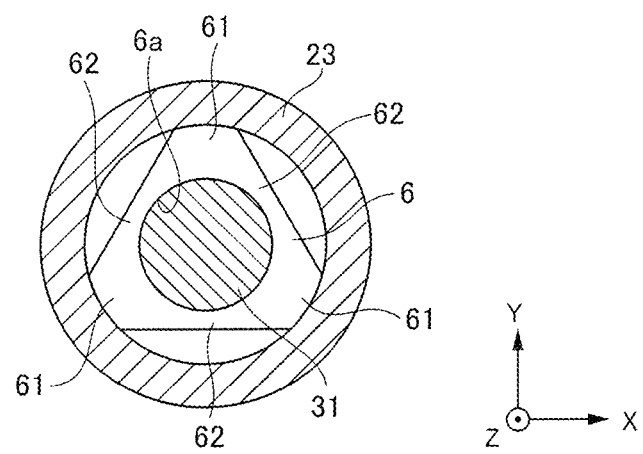

[Fig. 6]
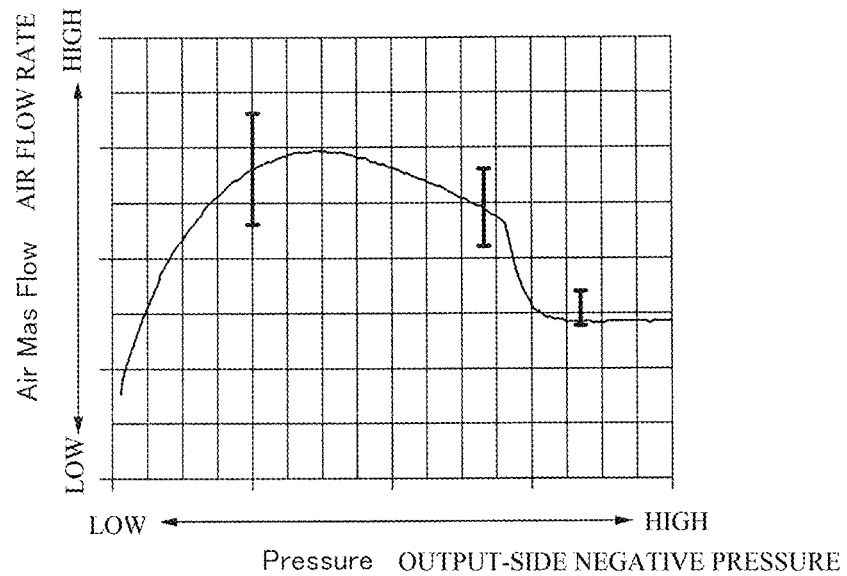
[Fig. 7]
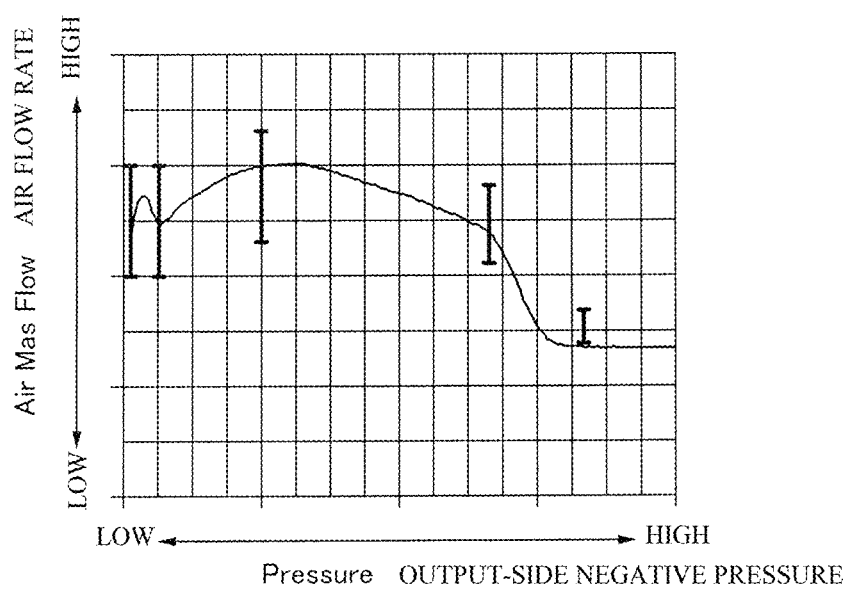

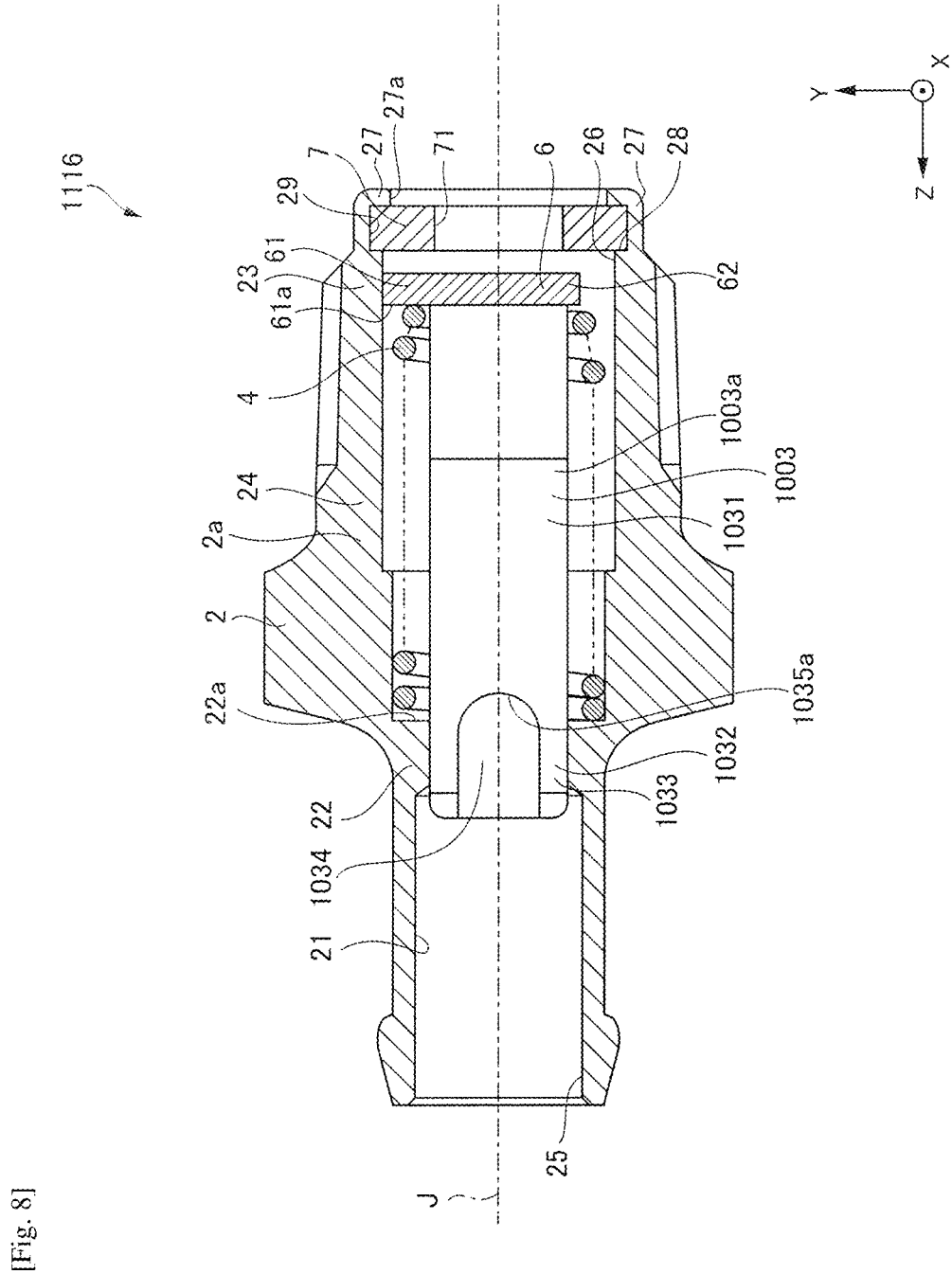
[Fig. 8]

[Fig. 9]
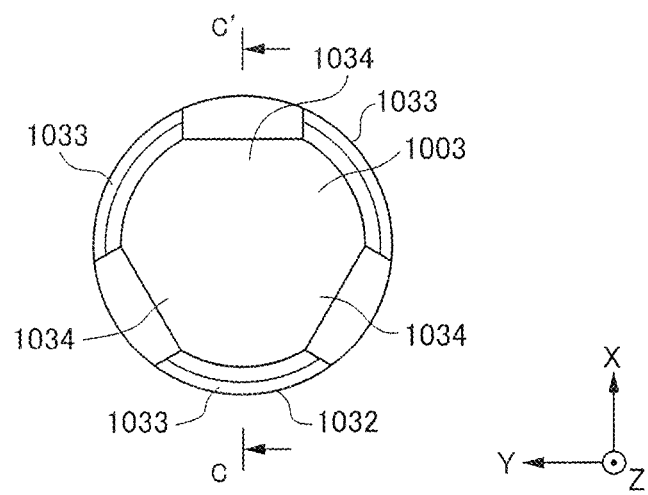
[Fig. 10]
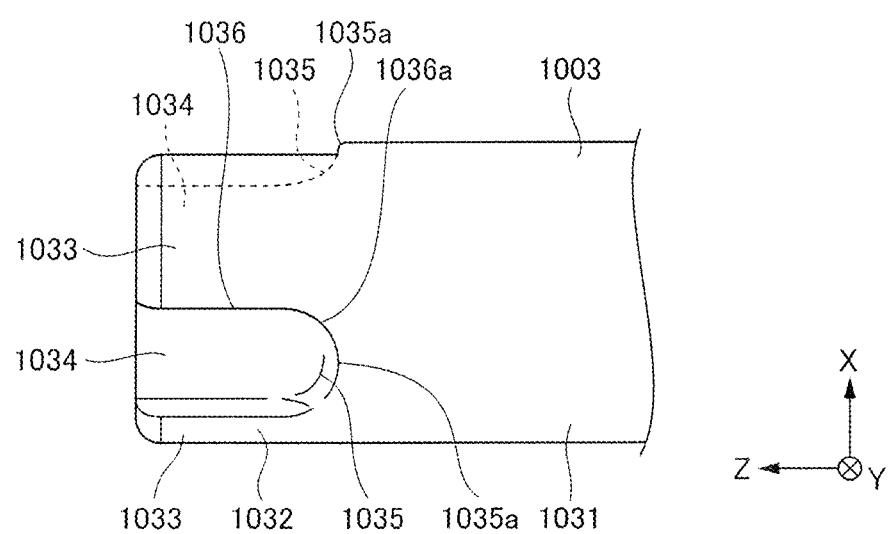

[Fig. 11]
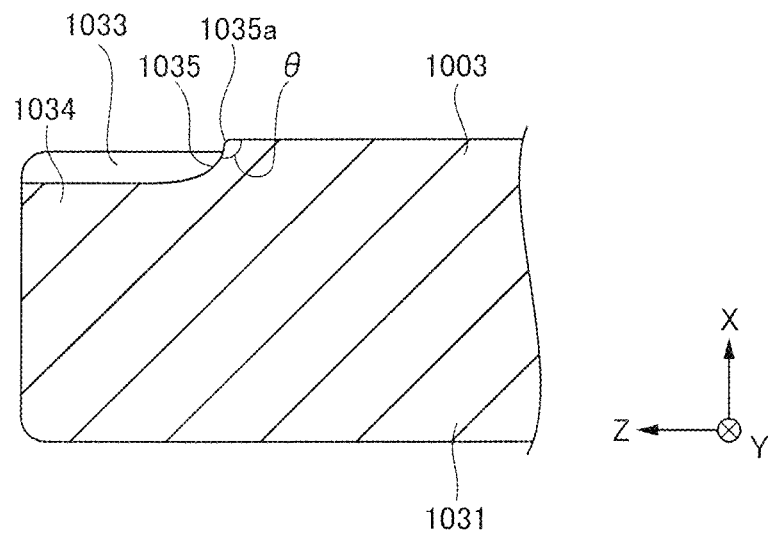

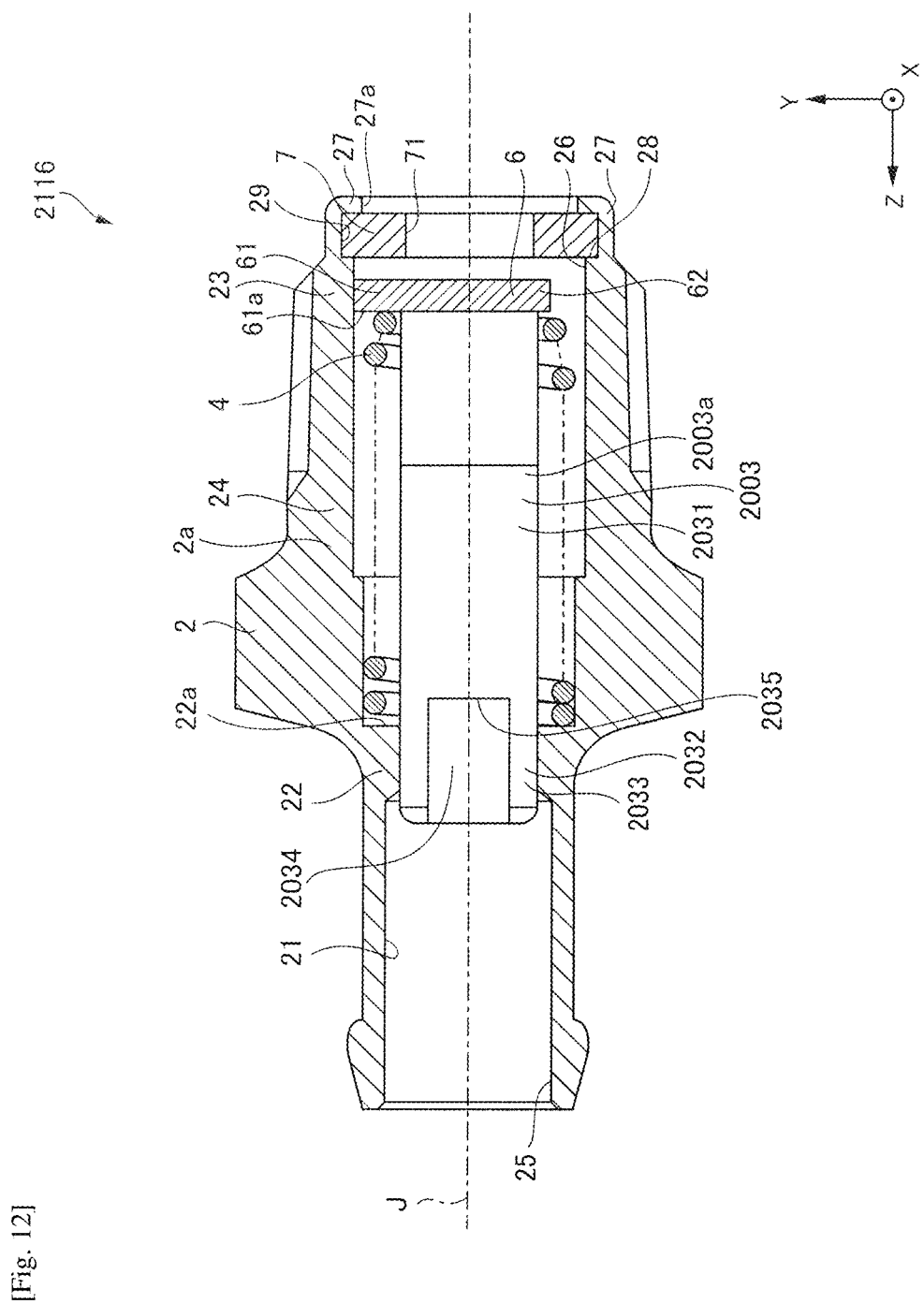
[Fig. 12]

[Fig. 13]
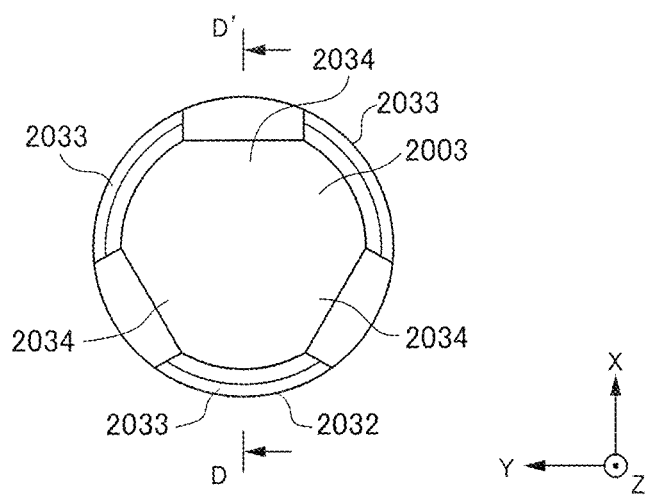
[Fig. 14]
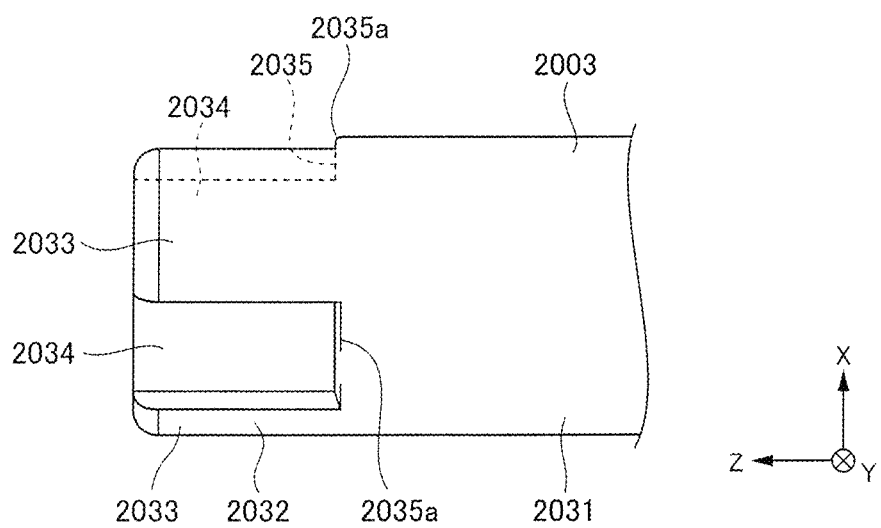

[Fig. 15]
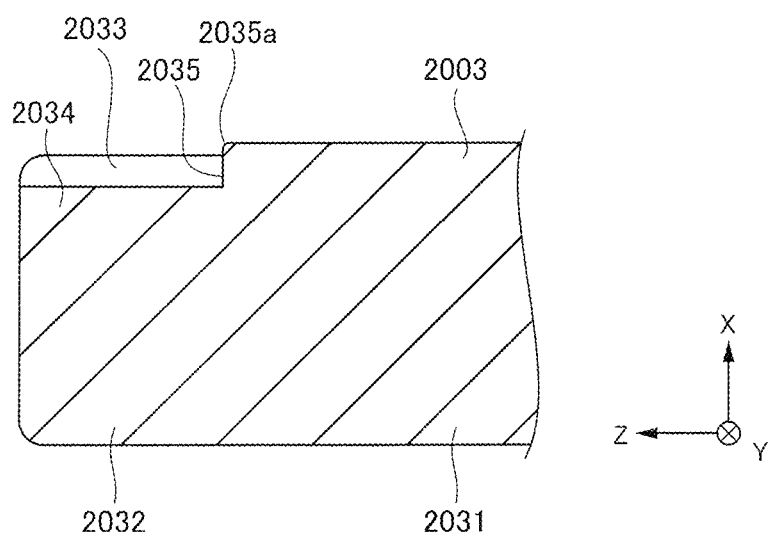

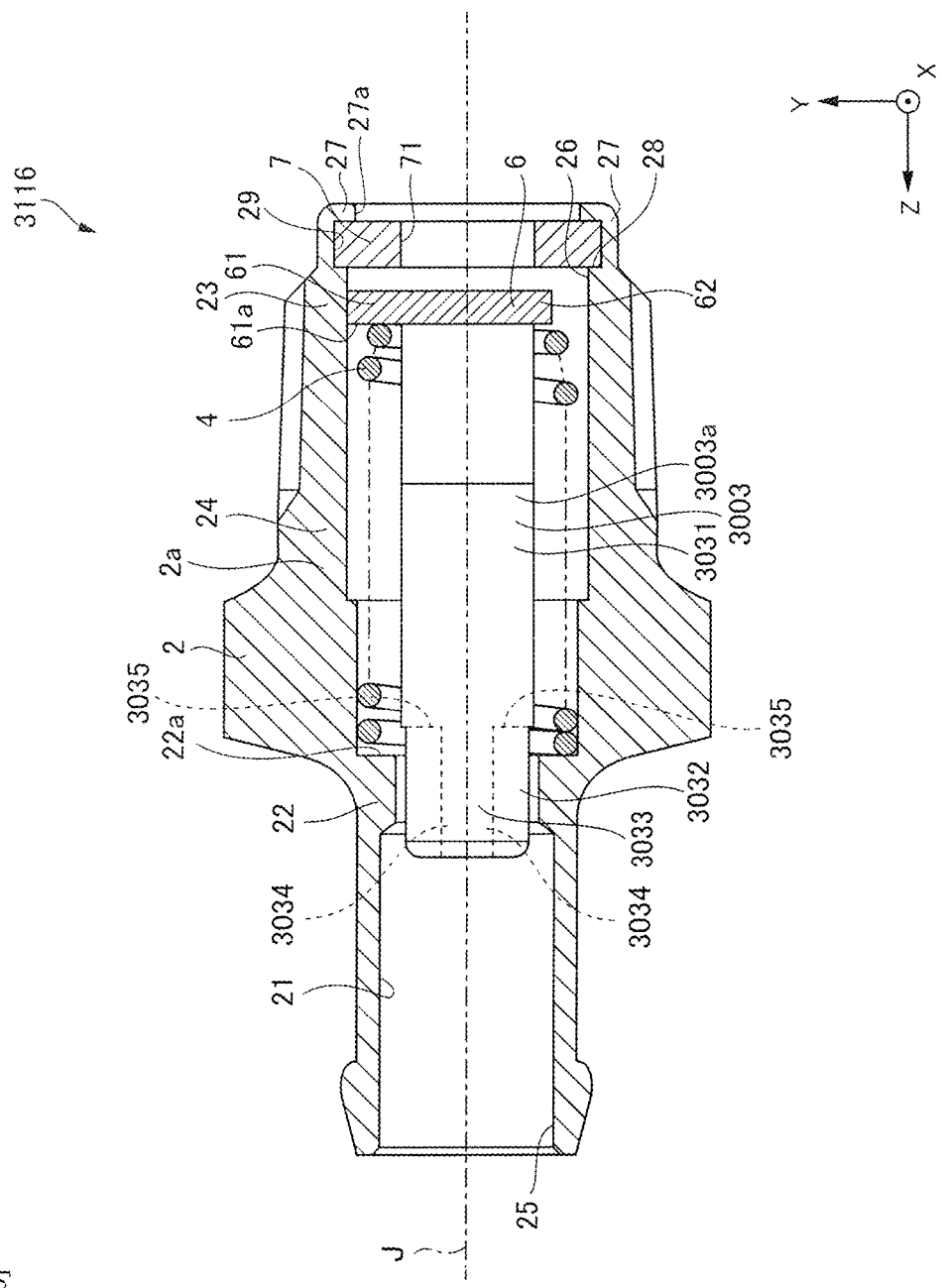
[Fig. 16]

[Fig. 17]
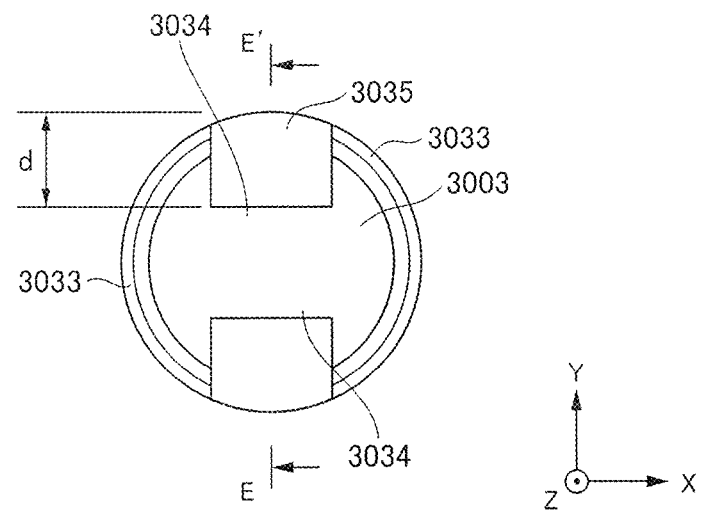
[Fig. 18]
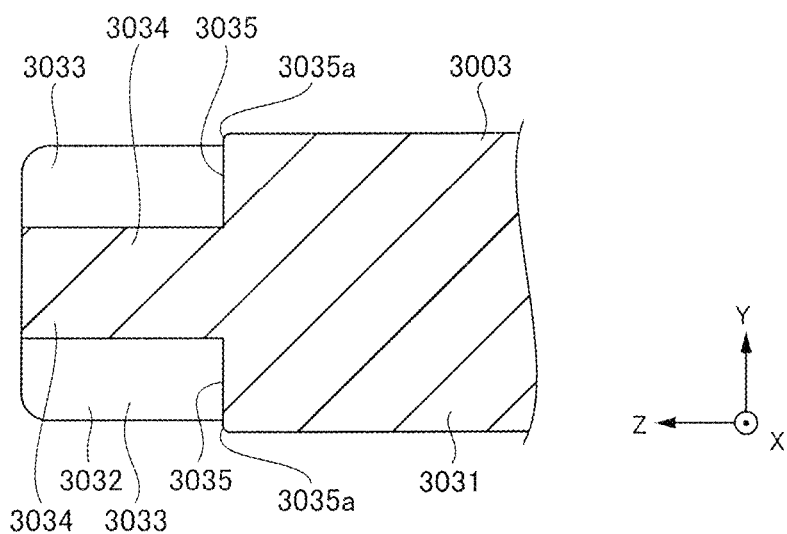

RECIRCULATION VALVE

CROSS REFERENCE TO RELATED APPLICATION

The present application claims priority under 35 U.S.C. § 119 to Japanese Application No. 2019-053531 filed on Mar. 20, 2019, the entire contents of which are hereby incorporated herein by reference.

1. FIELD

The present disclosure relates to a recirculation valve.

2. BACKGROUND

In the related art, recirculation valves for recirculating blowby gas in an internal combustion engine to a suction side are known. These recirculation valves are referred to as positive crankcase ventilation (PCV) valves and are disposed on a blowby gas path connecting a crankcase and the suction side (for example, an intake manifold) to each other. A PCV valve is opened due to a negative pressure on the suction side (entrance side to a combustion chamber for blowby gas which has passed through the PCV valve), such that blowby gas generated in the crankcase is recirculated to the suction side.

Japanese Unexamined Patent Publication No. 2018-28285 discloses an attachment structure of a PCV valve which resolves freezing inside a PCV valve using heat of blowby gas. In the PCV valve disclosed in Japanese Unexamined Patent Publication No. 2018-28285, a columnar valve main body portion is accommodated inside a cylindrical valve case, and blowby gas is recirculated through an opening between an inner circumference of a valve case and an outer circumference of the valve main body portion.

In internal combustion engines, for example, active promotion of recirculation of blowby gas is desired in response to automobile exhaust gas regulations. Incidentally, in PCV valves in the related art such as a PCV valve disclosed in Japanese Unexamined Patent Publication No. 2018-28285, when a negative pressure on a suction side is high, the flow rate of recirculating blowby gas increases in accordance therewith. However, in a situation where the negative pressure on the suction side is low, the flow rate of recirculating blowby gas is reduced. In Japanese Unexamined Patent Publication No. 2018-28285, in order to raise the flow rate of recirculating blowby gas in a situation where the negative pressure on the suction side is low, increasing an opening area between an inner circumference of a valve case and an outer circumference of a valve main body portion can be considered. However, in order to increase this opening area, there is a need to increase the diameter of a flow channel, and therefore there is a problem that a PCV valve in its entirety is increased in size, resulting in constraints on the layout of an engine.

SUMMARY

An example embodiment of the present disclosure provides a recirculation valve capable of actively recirculating a large amount of blowby gas in a situation where a negative pressure on an entrance side is low without increasing the size of the recirculation valve.

According to an example embodiment of the present disclosure of this application, a recirculation valve disposed on a blowby gas path to recirculate a blowby gas of an internal combustion engine to a suction side includes a housing that has a tubular portion including a penetration hole that penetrates the tubular portion in a direction parallel or substantially parallel to a central axis, a valve body that is capable of moving in the penetration hole in an axial direction, and a biasing member that biases the valve body to one side in the axial direction. The tubular portion includes a first opening that opens on one side of the penetration hole in the axial direction and is connected to an upstream side of the blowby gas path, a second opening that opens on the other side of the penetration hole in the axial direction and is connected to a downstream side of the blowby gas path, a first support portion that supports the valve body on the one side of the penetration hole in the axial direction, a second support portion that supports the valve body on the other side of the penetration hole in the axial direction, and a tubular barrel portion provided on the other side of the first support portion in the axial direction and one side of the second support portion in the axial direction. The valve body includes a first support target portion supported by the first support portion, a second support target portion supported by the second support portion, and a valve body barrel portion provided on the other side of the first support target portion in the axial direction and one side of the second support target portion in the axial direction. An inner circumference of the second support portion has a smaller diameter than an inner circumference of the tubular barrel portion. The first support target portion includes a first stepped surface extending outward in a radial direction in a boundary between the first stepped surface and the valve body barrel portion and is directed to the other side in the axial direction. The second support portion includes a second stepped surface extending inward in the radial direction in a boundary between the second stepped surface and the tubular barrel portion and is directed to one side in the axial direction. An end portion of the biasing member on one side in the axial direction comes into contact with the first stepped surface. An end portion of the biasing member on the other side in the axial direction comes into contact with the second stepped surface. The first support target portion receives a biasing force of the biasing member on the first stepped surface and is movable to one side in the axial direction, such that the first opening is blocked. The first support target portion is movable to the other side in the axial direction against a biasing force of the biasing member due to a negative pressure on the downstream side with respect to the upstream side, such that the first opening is opened. The first support target portion has a shape in which first contact portions whose end portions on an outward side in the radial direction come into contact with the first support portion and first separation portions whose end portions on the outward side in the radial direction are separated from the first support portion are alternately disposed in a circumferential direction. The second support target portion has a shape in which second contact portions whose end portions on the outward side in the radial direction come into contact with the second support portion and second separation portions whose end portions on the outward side in the radial direction are separated from the second support portion are alternately disposed in the circumferential direction.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a schematic constitution diagram illustrating an internal combustion engine in which a recirculation valve according to a first example embodiment of the present disclosure is applied.

FIG. 2 is a lateral cross-sectional view of a PCV valve 116 according to the first example embodiment of the present disclosure.

FIG. 3 is another lateral cross-sectional view of the PCV valve 116 according to the first example embodiment of the present disclosure.

FIG. 4 is a cross-sectional view along B-B' in FIG. 3.

FIG. 5 is a cross-sectional view along A-A' in FIG. 3.

FIG. 6 is a view illustrating operation characteristics of a PCV valve in the related art.

FIG. 7 is a view illustrating operation characteristics of the PCV valve 116 of the present example embodiment of the present disclosure.

FIG. 8 is a lateral cross-sectional view of a PCV valve 1116 according to a second example embodiment of the present disclosure.

FIG. 9 is a side view of a valve body 1003 in FIG. 8 from the other side in an axial direction.

FIG. 10 is a side view of the valve body 1003 in FIG. 9 from a negative Y side.

FIG. 11 is a cross-sectional view along C-C' in FIG. 9.

FIG. 12 is a lateral cross-sectional view of a PCV valve 2116 according to a third example embodiment of the present disclosure.

FIG. 13 is a side view of a valve body 2003 in FIG. 12 from the other side in the axial direction.

FIG. 14 is a side view of the valve body 2003 in FIG. 13 from the negative Y side.

FIG. 15 is a cross-sectional view along D-D' in FIG. 13.

FIG. 16 is a lateral cross-sectional view of a PCV valve 3116 according to the fourth example embodiment of the present disclosure.

FIG. 17 is a side view of a valve body 3003 in FIG. 16 from the other side in the axial direction.

FIG. 18 is a cross-sectional view along E-E' in FIG. 17.

DETAILED DESCRIPTION

Hereinafter, with reference to the drawings, PCV valves according to example embodiments of the present disclosure will be described. In addition, in the following drawings, in order to make each constitution easy to understand, there are cases where actual structures may differ from respective structures in scale, number, and the like.

In addition, in the drawings, an XYZ coordinate system is suitably indicated as a three-dimensional orthogonal coordinate system. In the XYZ coordinate system, a Z axis direction is a direction parallel to a central axis J illustrated in FIG. 2. An X axis direction is a direction in which a cross section of the cross-sectional view in FIG. 2 expands and a direction orthogonal to the Z axis direction. A Y axis direction is a direction orthogonal to the Z axis direction and the X axis direction. In all of the X axis direction, the Y axis direction, and the Z axis direction, sides directed by arrows illustrated in the diagrams are positive sides, and the opposite sides are negative sides.

In addition, in the following description, the positive side in the Z axis direction (positive Z side) will be described as "a rear side", and the negative side in the Z axis direction (negative Z side) will be described as "a front side". The rear side and the front side are simply names used for description and do not limit actual positional relationships or directions. In addition, unless otherwise specified, a direction (Z axis direction) parallel to the central axis J will be simply described as "an axial direction", a radial direction about the central axis J will be simply described as "a radial direction", and a circumferential direction about the central axis J, that is, a direction (θ direction) around the central axis J will be simply described as "a circumferential direction".

In this specification, a state of extending in the axial direction includes a case of extending in a direction inclined within a range of less than 45° with respect to the axial direction, in addition to a case of strictly extending in the axial direction (Z axis direction). In addition, in this specification, a state of extending in the radial direction includes a case of extending in a direction inclined within a range of less than 45° with respect to the radial direction, in addition to a case of strictly extending in the radial direction, that is, a direction perpendicular to the axial direction (Z axis direction).

First Example Embodiment

<Overall Constitution>

FIG. 1 is a schematic constitution diagram illustrating a constitution of an internal combustion engine in which a PCV valve according to a first example embodiment of the present disclosure is applied. An internal combustion engine 100 is a multi-cylinder engine including a plurality of sets of a piston 103 and a cylinder accommodating the piston 103. The cylinders are provided above a crankcase 102 and contain the pistons 103. In FIG. 1, for the sake of convenience, only one cylinder and one piston 103 are illustrated. The piston 103 moves inside a cylinder barrel of the cylinder in the longitudinal direction of the cylinder barrel. In accordance with this movement, a connecting rod 105 coupled to the piston 103 rotates a crankshaft 106. A combustion chamber 104 is disposed above the piston 103. An ignition plug for ignition of fuel is provided in the combustion chamber 104.

A suction valve 112 is provided in a suction port of the combustion chamber 104. An exhaust valve 113 is provided in an exhaust port of the combustion chamber 104. Both the suction valve 112 and the exhaust valve 113 are valves which are opened and closed by a variable valve timing (VVT) mechanism.

A suction path 110 is coupled to the suction port of the combustion chamber 104. A throttle valve 109 is disposed inside the suction path 110. Fresh air which has been suctioned into the suction path 110 is suctioned into the combustion chamber 104 via the throttle valve 109 and the suction valve 112 in order. Gas immediately before being suctioned into the combustion chamber 104 is mixed with fuel injected from an injector inside the suction path 110. Fuel which has entered the inside of the combustion chamber 104 together with fresh air ignites due to the ignition plug. Fuel which has combusted due to this ignition is increased in volume through gasification and moves the piston 103 in a direction away from the ignition plug.

Gas which has been generated in the combustion chamber 104 due to combustion of fuel is discharged to the outside as exhaust gas through the exhaust port of the combustion chamber 104 via the exhaust valve 113 and an exhaust path.

The internal combustion engine 100 includes a blowby gas path 115 connecting the crankcase 102 and a region on a downstream side of the throttle valve 109 in the suction path 110 to each other. A PCV valve 116 is provided in the blowby gas path 115. The PCV valve 116 is opened and closed due to a pressure difference between the inside of the suction path 110 and the inside of the crankcase 102 and recirculates blowby gas inside the crankcase 102 to the suction path 110.

<Constitution of PCV Valve 116>

Hereinafter, the PCV valve 116 according to the first example embodiment of the present disclosure will be described. FIGS. 2 and 3 are lateral cross-sectional views of the PCV valve 116 according to the first example embodiment of the present disclosure. FIG. 2 is a view illustrating a state where the PCV valve 116 is closed. FIG. 3 is a view illustrating a state where the PCV valve 116 is opened. The PCV valve 116 has a housing 2 that has a tubular portion 2a including a penetration hole 21 which penetrates the tubular portion 2a in a direction parallel to the central axis J, a valve body 3 that is capable of moving in the penetration hole 21 in the axial direction, and a biasing member 4 that biases the valve body 3 to one side (negative Z side) in the axial direction.

<Housing 2>

The tubular portion 2a of the housing 2 has a first opening 71 which opens on one side of the penetration hole 21 in the axial direction and is connected to an upstream side (crankcase 102 side) of the blowby gas path 115. The tubular portion 2a of the housing 2 has a second opening 25 which opens on the other side (positive Z side) of the penetration hole 21 in the axial direction and is connected to the downstream side (suction path 110 side) of the blowby gas path. The tubular portion 2a of the housing 2 has a first support portion 23 which supports the valve body 3 on the one side of the penetration hole 21 in the axial direction. The first support portion 23 supports the valve body 3 using its inner circumferential surface. The tubular portion 2a of the housing 2 has a second support portion 22 which supports the valve body 3 on the other side of the penetration hole 21 in the axial direction. The second support portion 22 supports the valve body 3 using its inner circumferential surface. The tubular portion 2a of the housing 2 has a tubular barrel portion 24 which is provided on the other side of the first support portion 23 in the axial direction and one side of the second support portion 22 in the axial direction. An inner circumference of the second support portion 22 has a smaller diameter than an inner circumference of the tubular barrel portion 24. The second support portion 22 has a second stepped surface 22a which extends inward in the radial direction in a boundary between the second stepped surface 22a and the tubular barrel portion 24 and is directed to one side in the axial direction. The tubular portion 2a of the housing 2 has an end portion 27 on one side in the axial direction. An inner circumferential surface 29 of the end portion 27 has a larger diameter than an inner circumferential surface 26 of the tubular barrel portion 24. The tubular barrel portion 24 has a stepped surface 28 which extends inward in the radial direction in a boundary between the stepped surface 28 and the end portion 27 and is directed to one side in the axial direction.

<Valve Seat Member 7>

The housing 2 has a valve seat member 7. The valve seat member 7 is a toric member. An inner circumference of the valve seat member 7 has a smaller diameter than an outer circumference of a flange member 6. The inner circumference of the valve seat member 7 forms the first opening 71. An outer circumference of the valve seat member 7 has a larger diameter than an inner circumferential surface 26 of the tubular barrel portion 24. The valve seat member 7 is accommodated on an inward side of the end portion 27 in the radial direction. In the valve seat member 7 accommodated in the end portion 27, a surface thereof directed to the other side in the axial direction comes into contact with the stepped surface 28. In a state where the valve seat member 7 is accommodated, a tip of the end portion 27 on one side in the axial direction is bent inward in the radial direction. In the valve seat member 7 accommodated in the end portion 27, a surface thereof directed to one side in the axial direction comes into contact with the tip of the end portion 27 which is on one side in the axial direction and is bent inward in the radial direction. An inner circumference of the tip of the end portion 27 which is on one side in the axial direction and is bent inward in the radial direction forms an opening 27a. The inner circumference of the tip of the end portion 27 which is on one side in the axial direction and is bent inward in the radial direction has a larger diameter than the inner circumference of the valve seat member 7. The inner circumference of the tip of the end portion 27 which is on one side in the axial direction and is bent inward in the radial direction has a smaller diameter than the outer circumference of the valve seat member 7.

<Valve Body 3>

The valve body 3 has a columnar member 3a, a collar member 5, and the flange member 6. In the present example embodiment, the columnar member 3a and the collar member 5 are separate members. Since they are separate members, each of the members can be produced without requiring complicated processing, so that a manufacturing step can be simplified. The columnar member 3a may be the same member as the collar member 5. In the present example embodiment, the columnar member 3a and the flange member 6 are separate members. Since they are separate members, each of the members can be produced without requiring complicated processing, so that a manufacturing step can be simplified. The columnar member 3a may be the same member as the flange member 6. The flange member 6 is a first support target portion which is supported by the first support portion 23. The collar member 5 is a second support target portion which is supported by the second support portion 22. The columnar member 3a has a valve body barrel portion 31 which is provided on the other side of the flange member 6 in the axial direction and one side of the collar member 5 in the axial direction. The columnar member 3a has an intermediate diameter portion 32 which is provided on the other side of the valve body barrel portion 31 in the axial direction. An outer circumference of the intermediate diameter portion 32 has a smaller diameter than an outer circumference of the valve body barrel portion 31. The columnar member 3a has a tapered portion 34 between the valve body barrel portion 31 and the intermediate diameter portion 32. The tapered portion 34 has a tapered part in which an outer circumference is gradually reduced in diameter from the valve body barrel portion 31 side toward the intermediate diameter portion 32 side. The columnar member 3a has a small diameter portion 33 which is provided on the other side of the intermediate diameter portion 32 in the axial direction. An outer circumference of the small diameter portion 33 has a smaller diameter than the outer circumference of the intermediate diameter portion 32.

The collar member 5 is press-fitted from an end portion of the small diameter portion 33 on the other side in the axial direction and is fixed at a position in contact with the intermediate diameter portion 32. The shape of the collar member viewed in the axial direction will be described below with reference to FIG. 4. The flange member 6 is fixed to an end portion of the valve body barrel portion 31 on one side in the axial direction in a press-fitted manner. The shape of the flange member 6 viewed in the axial direction will be described below with reference to FIG. 5. The flange member 6 has a first stepped surface 61a which extends outward in the radial direction in a boundary between the first stepped surface 61a and the valve body barrel portion 31 and is directed to the other side in the axial direction.

<Biasing Member 4>

In the present example embodiment, the biasing member 4 is a coil spring. For example, the biasing member 4 may be a member other than a coil spring, such as a leaf spring. An end portion of the biasing member 4 on one side in the axial direction comes into contact with the first stepped surface 61a. The end portion of the biasing member 4 on the other side in the axial direction comes into contact with the second stepped surface 22a. The biasing member 4 is accommodated between the inner circumference of the tubular barrel portion 24 and the outer circumference of the valve body barrel portion 31. The flange member 6 receives a biasing force of the biasing member 4 on the first stepped surface 61a and moves to one side in the axial direction, such that the first opening 71 is blocked (refer to FIG. 2). Accordingly, the valve body 3 serving as a valve blocks the first opening 71 of the valve seat member 7 serving as a valve seat, and the PCV valve 116 is closed. The flange member 6 moves to the other side in the axial direction against a biasing force of the biasing member 4 due to a negative pressure on the second opening 25 side with respect to the first opening 71 side (refer to FIG. 3). Accordingly, the valve body 3 serving as a valve opens the first opening 71 of the valve seat member 7 serving as a valve seat, and therefore the PCV valve 116 is opened.

<Collar Member 5>

FIG. 4 is a cross-sectional view along B-B' in FIG. 3. The collar member 5 is a plate-shaped member having a shape in which second contact portions 51 whose end portions on an outward side in the radial direction come into contact with the second support portion 22 and second separation portions 52 whose end portions on the outward side in the radial direction are separated from the second support portion 22 are alternately disposed in the circumferential direction. In the present example embodiment, in the collar member 5, three second contact portions 51 and three second separation portions 52 are disposed in the circumferential direction. The end portions of the second contact portions 51 on the outward side in the radial direction are positioned on the outward side in the radial direction from the end portion of the valve body barrel portion 31 on the outward side in the radial direction. The collar member 5 has a penetration hole 5a which penetrates the collar member 5 in the axial direction. The small diameter portion 33 is press-fitted into the penetration hole 5a, such that the collar member 5 is fixed to the columnar member 3a. According to the present example embodiment, since the sizes of flow channels formed between the second contact portions 51 and the second separation portions 52 are uniform regardless of the position of the valve body 3 in the axial direction, the flow rate of recirculating blowby gas can be ensured. According to the present example embodiment, in the second support portion 22, the valve body 3 is supported at three points (three contact points between the second contact portions 51 and the second support portion 22), it can be supported stably, and the flow rate of recirculating blowby gas can be ensured.

<Flange Member 6>

FIG. 5 is a cross-sectional view along A-A' in FIG. 3. The flange member 6 is a plate-shaped member having a shape in which first contact portions 61 whose end portions on the outward side in the radial direction come into contact with the first support portion 23 and first separation portions 62 whose end portions on the outward side in the radial direction are separated from the first support portion 23 are alternately disposed in the circumferential direction. In the present example embodiment, in the flange member 6, three first contact portions 61 and three first separation portions 62 are disposed in the circumferential direction. The end portions of the first contact portions 61 on the outward side in the radial direction are positioned on the outward side in the radial direction from the end portion of the valve body barrel portion 31 on the outward side in the radial direction. The flange member 6 has a penetration hole 6a which penetrates the flange member 6 in the axial direction. The valve body barrel portion 31 is press-fitted into the penetration hole 6a, such that the flange member 6 is fixed to the columnar member 3a. According to the present example embodiment, since the sizes of flow channels formed between the first contact portions 61 and the first separation portions 62 are uniform regardless of the position of the valve body 3 in the axial direction, the flow rate of recirculating blowby gas can be ensured. According to the present example embodiment, in the first support portion 23, the valve body 3 is supported at three points (three contact points between the first contact portions 61 and the first support portion 23), it can be supported stably, and the flow rate of recirculating blowby gas can be ensured.

In the present example embodiment, the number of first contact portions 61 is the same as the number of second contact portions 51. In the present example embodiment, the positions of the first contact portions 61 in the circumferential direction are the same positions as the positions of the second contact portions in the circumferential direction. In the present example embodiment, the positions of the first separation portions 62 in the circumferential direction are the same positions as the positions of the second separation portions 52 in the circumferential direction. Accordingly, in the flow channel in which blowby gas flows in the axial direction, flows in directions not parallel to the axial direction are reduced and occurrence of a vortex which becomes an obstacle to a flow can be reduced, so that a smooth flow of blowby gas can be ensured.

<Operation of PCV Valve 116>

When a force moving the valve body 3 to the other side in the axial direction due to a negative pressure on the second opening 25 side with respect to the first opening 71 side is weaker than a biasing force of the biasing member 4, the flange member 6 comes into contact with the valve seat member 7 and the first opening 71 is blocked, such that the PCV valve 116 is closed. When a force moving the valve body 3 to the other side in the axial direction due to a negative pressure on the second opening 25 side with respect to the first opening 71 side is stronger than a biasing force of the biasing member 4, the flange member 6 is separated from the valve seat member 7 and the first opening 71 is opened, such that the PCV valve 116 is opened. At this time, flow channels of blowby gas are formed by the first opening 71, spaces between the first support portion 23 and the first separation portions 62, a space between the tubular barrel portion 24 and the valve body barrel portion 31, spaces between the second support portion 22 and the second separation portions 52, and the second opening 25.

According to the present example embodiment, since flow channels are formed by the first separation portions 62 and the second separation portions 52, it is possible to provide a recirculation valve capable of actively recirculating a large amount of blowby gas in a situation where a negative pressure on an entrance side is low without increasing the size of the recirculation valve.

FIG. 6 is a view illustrating operation characteristics of a PCV valve in the related art. FIG. 7 is a view illustrating operation characteristics of the PCV valve 116 of the present example embodiment. In FIGS. 6 and 7, the horizontal axis indicates a negative pressure (output-side negative pressure) on a suction side (entrance side to a combustion chamber for blowby gas which has passed through the PCV valve), and the vertical axis indicates a flow rate of blowby gas flowing via the PCV valve. In the PCV valve in the related art illustrated in FIG. 6, for example, in the case of a region in which a negative pressure on the suction side is low, the flow rate of blowby gas has not been able to be sufficiently ensured. In contrast, in the PCV valve 116 of the present example embodiment, as illustrated in FIG. 7, for example, even in the case of a region in which the negative pressure on the suction side is low, the flow rate of blowby gas can be sufficiently ensured. Therefore, according to the PCV valve 116 of the present example embodiment, for example, even in a low rotation area of the internal combustion engine 100, recirculation of blowby gas is promoted.

Second Example Embodiment

In a second example embodiment of the present disclosure, the constitution of an internal combustion engine is the same as that of the first example embodiment. Therefore, description of the overall constitution including the internal combustion engine will be omitted.

<PCV Valve 1116>

Hereinafter, a PCV valve 1116 according to the second example embodiment of the present disclosure will be described. FIG. 8 is a lateral cross-sectional view of the PCV valve 1116 according to the second example embodiment of the present disclosure. FIG. 8 is a view illustrating a state where the PCV valve 1116 is opened. The PCV valve 1116 has the housing 2 that has the tubular portion 2a including the penetration hole 21 which penetrates the tubular portion 2a in a direction parallel to the central axis J, a valve body 1003 that is capable of moving in the penetration hole 21 in the axial direction, and the biasing member 4 that biases the valve body 1003 to one side (negative Z side) in the axial direction. In the PCV valve 1116 of the second example embodiment, the same reference signs are applied to constitutions similar to those of the PCV valve 116 of the first example embodiment, and detailed description will be omitted.

<Valve Body 1003>

The valve body 1003 has a columnar member 1003a and the flange member 6. In the present example embodiment, the columnar member 1003a and the flange member 6 are separate members. Since they are separate members, each of the members can be produced without requiring complicated processing, so that a manufacturing step can be simplified. The columnar member 1003a may be the same member as the flange member 6. The flange member 6 is a first support target portion which is supported by the first support portion 23. The columnar member 1003a has a valve body barrel portion 1031 which is provided on the other side of the flange member 6 in the axial direction. The columnar member 1003a has a second support target portion 1032 which is provided on the other side of the valve body barrel portion 1031 in the axial direction.

The flange member 6 is fixed to an end portion of the valve body barrel portion 1031 on one side in the axial direction in a press-fitted manner. The shape of the flange member 6 viewed in the axial direction is a shape illustrated in FIG. 5. The flange member 6 has the first stepped surface 61a which extends outward in the radial direction in a boundary between the first stepped surface 61a and the valve body barrel portion 1031 and is directed to the other side in the axial direction.

<Biasing Member 4>

The end portion of the biasing member 4 on one side in the axial direction comes into contact with the first stepped surface 61a. The end portion of the biasing member 4 on the other side in the axial direction comes into contact with the second stepped surface 22a. The biasing member 4 is accommodated between the inner circumference of the tubular barrel portion 24 and an outer circumference of the valve body barrel portion 1031. The flange member 6 receives a biasing force of the biasing member 4 on the first stepped surface 61a and moves to one side in the axial direction, such that the first opening 71 is blocked. Accordingly, the valve body 1003 serving as a valve blocks the first opening 71 of the valve seat member 7 serving as a valve seat, and the PCV valve 1116 is closed. The flange member 6 moves to the other side in the axial direction against a biasing force of the biasing member 4 due to a negative pressure on the second opening 25 side with respect to the first opening 71 side. Accordingly, the valve body 1003 serving as a valve opens the first opening 71 of the valve seat member 7 serving as a valve seat, and therefore the PCV valve 1116 is opened.

<Second Support Target Portion 1032>

In the outer circumference thereof, the second support target portion 1032 has second contact portions 1033 whose end portions on the outward side in the radial direction come into contact with the second support portion 22 and second separation portions 1034 whose end portions on the outward side in the radial direction are separated from the second support portion 22. The second separation portions 1034 are recessed inward in the radial direction in an outer circumference of the second support target portion 1032.

FIG. 9 is a side view of the valve body 1003 in FIG. 8 from the other side in the axial direction. In FIG. 8, directions are indicated in the drawings such that the upper side is a positive Y side and the lower side is a negative Y side. However, in FIG. 9, directions are indicated in the drawings such that the upper side is a positive x side and the lower side is a negative x side. The second separation portion 1034 extends in the axial direction from an end portion of the second support target portion 1032 on the other side in the axial direction toward the valve body barrel portion 1031. A length of this second separation portion 1034 extending in the axial direction may be set in accordance with the flow rate of flowing blowby gas. In the present example embodiment, in the second support target portion 1032, three second contact portions 1033 and three second separation portions 1034 are disposed in the circumferential direction.

FIG. 10 is a side view of the valve body 1003 in FIG. 9 from the negative Y side. FIG. 11 is a cross-sectional view along C-C' in FIG. 9. An outer diameter of the second support target portion 1032 is the same diameter as an outer diameter of the valve body barrel portion 1031. According to the present example embodiment, for example, the second contact portions 1033 and the second separation portions 1034 can be formed by only scraping off an end portion of the columnar member 1003a on the other side in the axial direction, so that a manufacturing step can be simplified.

The second separation portion 1034 has a tapered portion 1035 which extends to the other end side in the axial direction and inward in the radial direction from the valve body barrel portion 1031. Due to this tapered portion 1035 provided therein, in order to form the second separation portions 1034, regarding work of scraping off the end portion of the columnar member 1003a on the other side in the axial direction, an outer circumferential surface of the columnar member 1003a can be scraped off in the axial direction, so that this working step can be facilitated. Due to this tapered portion 1035 provided therein, blowby gas flowing from one side in the axial direction to the other side in the axial direction can flow along the tapered portion 1035, so that blowby gas can flow smoothly.

In addition, due to the tapered portion 1035 provided therein, as illustrated in FIG. 11, on a surface orthogonal to a Y axis, an angle between an outer circumferential surface of the valve body barrel portion 1031 and the tapered portion 1035 can become an obtuse angle. Accordingly, when the valve body 1003 moves from one end side in the axial direction to the other end side in the axial direction, a corner portion 1035a can be made difficult to interfere with an end portion of the second stepped surface 22a on the inward side in the radial direction, so that the valve body 1003 can move smoothly in the axial direction. The corner portion 1035a is a corner portion at which the outer circumferential surface of the valve body barrel portion 1031 and the tapered portion 1035 intersect each other. In addition, in the present example embodiment, the corner portion 1035a is rounded and has a radius of curvature set in advance. Accordingly, the valve body 1003 can move more smoothly in the axial direction.

In addition, in the present example embodiment, as illustrated in FIG. 10, the second separation portion 1034 has a radius of curvature set in advance in a connection portion 1036a between an end portion 1036 thereof in the circumferential direction and the corner portion 1035a. Accordingly, the valve body 1003 can move more smoothly in the axial direction.

According to the present example embodiment, since the sizes of flow channels formed between the second contact portions 1033 and the second separation portions 1034 are uniform regardless of the position of the valve body 1003 in the axial direction, the flow rate of recirculating blowby gas can be ensured.

<Operation of PCV Valve 1116>

When a force moving the valve body 1003 to the other side in the axial direction due to a negative pressure on the second opening 25 side with respect to the first opening 71 side is weaker than a biasing force of the biasing member 4, the flange member 6 comes into contact with the valve seat member 7 and the first opening 71 is blocked, such that the PCV valve 1116 is closed. When a force moving the valve body 1003 to the other side in the axial direction due to a negative pressure on the second opening 25 side with respect to the first opening 71 side is stronger than a biasing force of the biasing member 4, the flange member 6 is separated from the valve seat member 7 and the first opening 71 is opened, such that the PCV valve 1116 is opened. At this time, flow channels of blowby gas are formed by the first opening 71, spaces between the first support portion 23 and the first separation portions 62, a space between the tubular barrel portion 24 and the valve body barrel portion 1031, spaces between the second support portion 22 and the second separation portions 1034, and the second opening 25.

According to the present example embodiment, since flow channels are formed by the first separation portions 62 and the second separation portions 1034, it is possible to provide a recirculation valve capable of actively recirculating a large amount of blowby gas in a situation where a negative pressure on an entrance side is low without increasing the size of the recirculation valve.

Third Example Embodiment

In a third example embodiment of the present disclosure, the constitution of an internal combustion engine is the same as that of the first example embodiment. Therefore, description of the overall constitution including the internal combustion engine will be omitted.

<PCV Valve 2116>

Hereinafter, a PCV valve 2116 according to the third example embodiment of the present disclosure will be described. FIG. 12 is a lateral cross-sectional view of the PCV valve 2116 according to the third example embodiment of the present disclosure. FIG. 12 is a view illustrating a state where the PCV valve 2116 is opened. The PCV valve 2116 has the housing 2 that has the tubular portion 2a including the penetration hole 21 which penetrates the tubular portion 2a in a direction parallel to the central axis J, a valve body 2003 that is capable of moving in the penetration hole 21 in the axial direction, and the biasing member 4 that biases the valve body 2003 to one side (negative Z side) in the axial direction. In the PCV valve 2116 of the third example embodiment, the same reference signs are applied to constitutions similar to those of the PCV valve 116 of the first example embodiment, and detailed description will be omitted.

<Valve Body 2003>

The valve body 2003 has a columnar member 2003a and the flange member 6. In the present example embodiment, the columnar member 2003a and the flange member 6 are separate members. Since they are separate members, each of the members can be produced without requiring complicated processing, so that a manufacturing step can be simplified. The columnar member 2003a may be the same member as the flange member 6. The flange member 6 is a first support target portion which is supported by the first support portion 23. The columnar member 2003a has a valve body barrel portion 2031 which is provided on the other side of the flange member 6 in the axial direction. The columnar member 2003a has a second support target portion 2032 which is provided on the other side of the valve body barrel portion 2031 in the axial direction.

The flange member 6 is fixed to an end portion of the valve body barrel portion 2031 on one side in the axial direction in a press-fitted manner. The shape of the flange member 6 viewed in the axial direction is a shape illustrated in FIG. 5. The flange member 6 has the first stepped surface 61a which extends outward in the radial direction in a boundary between the first stepped surface 61a and the valve body barrel portion 2031 and is directed to the other side in the axial direction.

<Biasing Member 4>

The end portion of the biasing member 4 on one side in the axial direction comes into contact with the first stepped surface 61a. The end portion of the biasing member 4 on the other side in the axial direction comes into contact with the second stepped surface 22a. The biasing member 4 is accommodated between the inner circumference of the tubular barrel portion 24 and an outer circumference of the valve body barrel portion 2031. The flange member 6 receives a biasing force of the biasing member 4 on the first stepped surface 61a and moves to one side in the axial direction, such that the first opening 71 is blocked. Accordingly, the valve body 2003 serving as a valve blocks the first opening 71 of the valve seat member 7 serving as a valve seat, and the PCV valve 2116 is closed. The flange member 6 moves to the other side in the axial direction against a biasing force of the biasing member 4 due to a negative pressure on the second opening 25 side with respect to the first opening 71 side. Accordingly, the valve body 2003 serving as a valve opens the first opening 71 of the valve seat member 7 serving as a valve seat, and therefore the PCV valve 2116 is opened.

<Second Support Target Portion 2032>

In the outer circumference thereof, the second support target portion 2032 has second contact portions 2033 whose end portions on the outward side in the radial direction come into contact with the second support portion 22 and second separation portions 2034 whose end portions on the outward side in the radial direction are separated from the second support portion 22. The second separation portions 2034 are recessed inward in the radial direction in an outer circumference of the second support target portion 2032.

FIG. 13 is a side view of the valve body 2003 in FIG. 12 from the other side in the axial direction. In FIG. 12, directions are indicated in the drawings such that the upper side is the positive Y side and the lower side is the negative Y side. However, in FIG. 13, directions are indicated in the drawings such that the upper side is the positive x side and the lower side is the negative x side. The second separation portion 2034 extends in the axial direction from an end portion of the second support target portion 2032 on the other side in the axial direction toward the valve body barrel portion 2031. A length of this second separation portion 2034 extending in the axial direction may be set in accordance with the flow rate of flowing blowby gas. In the present example embodiment, in the second support target portion 2032, three second contact portions 2033 and three second separation portions 2034 are disposed in the circumferential direction.

FIG. 14 is a side view of the valve body 2003 in FIG. 13 from the negative Y side. FIG. 15 is a cross-sectional view along D-D' in FIG. 13. An outer diameter of the second support target portion 2032 is the same diameter as an outer diameter of the valve body barrel portion 2031. According to the present example embodiment, for example, the second contact portions 2033 and the second separation portions 2034 can be formed by only scraping off an end portion of the columnar member 2003a on the other side in the axial direction, so that a manufacturing step can be simplified.

The second separation portion 2034 has a wall portion 2035 which extends inward in the radial direction from the valve body barrel portion 2031. The wall portion 2035 is orthogonal to the axial direction. Due to this wall portion 2035 provided therein, in order to form the second separation portions 2034, in work of scraping off the end portion of the columnar member 2003a on the other side in the axial direction, the working step can be facilitated through processing performed from an outer circumferential surface of the columnar member 2003a orthogonal to the axial direction.

A corner portion 2035a is a corner portion at which an outer circumferential surface of the valve body barrel portion 2031 and the wall portion 2035 intersect each other. In the present example embodiment, the corner portion 2035a is rounded and has a radius of curvature set in advance. Accordingly, the valve body 2003 can move smoothly in the axial direction.

According to the present example embodiment, since the sizes of flow channels formed between the second contact portions 2033 and the second separation portions 2034 are uniform regardless of the position of the valve body 2003 in the axial direction, the flow rate of recirculating blowby gas can be ensured.

<Operation of PCV Valve 2116>

When a force moving the valve body 2003 to the other side in the axial direction due to a negative pressure on the second opening 25 side with respect to the first opening 71 side is weaker than a biasing force of the biasing member 4, the flange member 6 comes into contact with the valve seat member 7 and the first opening 71 is blocked, such that the PCV valve 2116 is closed. When a force moving the valve body 2003 to the other side in the axial direction due to a negative pressure on the second opening 25 side with respect to the first opening 71 side is stronger than a biasing force of the biasing member 4, the flange member 6 is separated from the valve seat member 7 and the first opening 71 is opened, such that the PCV valve 2116 is opened. At this time, flow channels of blowby gas are formed by the first opening 71, spaces between the first support portion 23 and the first separation portions 62, a space between the tubular barrel portion 24 and the valve body barrel portion 2031, spaces between the second support portion 22 and the second separation portions 2034, and the second opening 25.

According to the present example embodiment, since flow channels are formed by the first separation portions 62 and the second separation portions 2034, it is possible to provide a recirculation valve capable of actively recirculating a large amount of blowby gas in a situation where a negative pressure on an entrance side is low without increasing the size of the recirculation valve.

Fourth Example Embodiment

In a fourth example embodiment of the present disclosure, the constitution of an internal combustion engine is the same as that of the first example embodiment. Therefore, description of the overall constitution including the internal combustion engine will be omitted.

<PCV Valve 3116>

Hereinafter, a PCV valve 3116 according to the fourth example embodiment of the present disclosure will be described. FIG. 16 is a lateral cross-sectional view of the PCV valve 3116 according to the fourth example embodiment of the present disclosure. FIG. 16 is a view illustrating a state where the PCV valve 3116 is opened. The PCV valve 3116 has the housing 2 that has the tubular portion 2a including the penetration hole 21 which penetrates the tubular portion 2a in a direction parallel to the central axis J, a valve body 3003 that is capable of moving in the penetration hole 21 in the axial direction, and the biasing member 4 that biases the valve body 3003 to one side (negative Z side) in the axial direction. In the PCV valve 3116 of the fourth example embodiment, the same reference signs are applied to constitutions similar to those of the PCV valve 116 of the first example embodiment, and detailed description will be omitted.

<Valve Body 3003>

The valve body 3003 has a columnar member 3003a and the flange member 6. In the present example embodiment, the columnar member 3003a and the flange member 6 are separate members. Since they are separate members, each of the members can be produced without requiring complicated processing, so that a manufacturing step can be simplified. The columnar member 3003a may be the same member as the flange member 6. The flange member 6 is a first support target portion which is supported by the first support portion 23. The columnar member 3003a has a valve body barrel portion 3031 which is provided on the other side of the flange member 6 in the axial direction. The columnar member 3003a has a second support target portion 3032 which is provided on the other side of the valve body barrel portion 3031 in the axial direction.

The flange member 6 is fixed to an end portion of the valve body barrel portion 3031 on one side in the axial direction in a press-fitted manner. The shape of the flange member 6 viewed in the axial direction is a shape illustrated in FIG. 5. The flange member 6 has the first stepped surface 61a which extends outward in the radial direction in a boundary between the first stepped surface 61a and the valve body barrel portion 3031 and is directed to the other side in the axial direction.

<Biasing Member 4>

The end portion of the biasing member 4 on one side in the axial direction comes into contact with the first stepped surface 61a. The end portion of the biasing member 4 on the other side in the axial direction comes into contact with the second stepped surface 22a. The biasing member 4 is accommodated between the inner circumference of the tubular barrel portion 24 and an outer circumference of the valve body barrel portion 3031. The flange member 6 receives a biasing force of the biasing member 4 on the first stepped surface 61a and moves to one side in the axial direction, such that the first opening 71 is blocked. Accordingly, the valve body 3003 serving as a valve blocks the first opening 71 of the valve seat member 7 serving as a valve seat, and the PCV valve 3116 is closed. The flange member 6 moves to the other side in the axial direction against a biasing force of the biasing member 4 due to a negative pressure on the second opening 25 side with respect to the first opening 71 side. Accordingly, the valve body 3003 serving as a valve opens the first opening 71 of the valve seat member 7 serving as a valve seat, and therefore the PCV valve 3116 is opened.

<Second Support Target Portion 3032>

In the outer circumference thereof, the second support target portion 3032 has second contact portions 3033 whose end portions on the outward side in the radial direction come into contact with the second support portion 22 and second separation portions 3034 whose end portions on the outward side in the radial direction are separated from the second support portion 22. The second separation portions 3034 are recessed inward in the radial direction in an outer circumference of the second support target portion 3032.

FIG. 17 is a side view of the valve body 3003 in FIG. 16 from the other side in the axial direction. The second separation portion 3034 extends in the axial direction from an end portion of the second support target portion 3032 on the other side in the axial direction toward the valve body barrel portion 3031. A length of this second separation portion 3034 extending in the axial direction may be set in accordance with the flow rate of flowing blowby gas. In the present example embodiment, in the second support target portion 3032, two second contact portions 3033 and two second separation portions 3034 are disposed in the circumferential direction. According to this constitution, as illustrated in FIG. 17, a distance d which is a distance from the outer circumference of the second support target portion 3032 to an end portion of the second separation portion 3034 on the inward side in the radial direction can be lengthened, so that a large opening area for the flow channel of blowby gas can be ensured.

FIG. 18 is a cross-sectional view along E-E' in FIG. 17. An outer diameter of the second support target portion 3032 is the same diameter as an outer diameter of the valve body barrel portion 3031. According to the present example embodiment, for example, the second contact portions 3033 and the second separation portions 3034 can be formed by only scraping off an end portion of the columnar member 3003a on the other side in the axial direction, so that a manufacturing step can be simplified.

The second separation portion 3034 has a wall portion 3035 which extends inward in the radial direction from the valve body barrel portion 3031. The wall portion 3035 is orthogonal to the axial direction. Due to this wall portion 3035 provided therein, in order to form the second separation portions 3034, in work of scraping off the end portion of the columnar member 3003a on the other side in the axial direction, the working step can be facilitated through processing performed from an outer circumferential surface of the columnar member 3003a orthogonal to the axial direction.

A corner portion 3035a is a corner portion at which an outer circumferential surface of the valve body barrel portion 3031 and the wall portion 3035 intersect each other. In the present example embodiment, the corner portion 3035a is rounded and has a radius of curvature set in advance. Accordingly, the valve body 3003 can move smoothly in the axial direction.

According to the present example embodiment, since the sizes of flow channels formed between the second contact portions 3033 and the second separation portions 3034 are uniform regardless of the position of the valve body 3003 in the axial direction, the flow rate of recirculating blowby gas can be ensured.

<Operation of PCV Valve 2116>

When a force moving the valve body 3003 to the other side in the axial direction due to a negative pressure on the second opening 25 side with respect to the first opening 71 side is weaker than a biasing force of the biasing member 4, the flange member 6 comes into contact with the valve seat member 7 and the first opening 71 is blocked, such that the PCV valve 3116 is closed. When a force moving the valve body 3003 to the other side in the axial direction due to a negative pressure on the second opening 25 side with respect to the first opening 71 side is stronger than a biasing force of the biasing member 4, the flange member 6 is separated from the valve seat member 7 and the first opening 71 is opened, such that the PCV valve 3116 is opened. At this time, flow channels of blowby gas are formed by the first opening 71, spaces between the first support portion 23 and the first separation portions 62, a space between the tubular barrel portion 24 and the valve body barrel portion 3031, spaces between the second support portion 22 and the second separation portions 3034, and the second opening 25.

According to the present example embodiment, since flow channels are formed by the first separation portions 62 and the second separation portions 3034, it is possible to provide a recirculation valve capable of actively recirculating a large amount of blowby gas in a situation where a negative pressure on an entrance side is low without increasing the size of the recirculation valve.

The purposes of the PCV valves of the example embodiments described above are not particularly limited. The PCV valves of the example embodiments described above are mounted in vehicles, for example. In addition, each constitution of the respective example embodiments described above can be combined suitably within a range not contradicting each other.

According to a first exemplary disclosure of this application, there is provided a recirculation valve disposed on a blowby gas path for recirculating blowby gas of an internal combustion engine to a suction side. The recirculation valve includes a housing that has a tubular portion including a penetration hole which penetrates the tubular portion in a direction parallel to a central axis, a valve body that is capable of moving in the penetration hole in an axial direction, and a biasing member that biases the valve body to one side in the axial direction. The tubular portion has a first opening which opens on one side of the penetration hole in the axial direction and is connected to an upstream side of the blowby gas path, a second opening which opens on the other side of the penetration hole in the axial direction and is connected to a downstream side of the blowby gas path, a first support portion which supports the valve body on the one side of the penetration hole in the axial direction, a second support portion which supports the valve body on the other side of the penetration hole in the axial direction, and a tubular barrel portion which is provided on the other side of the first support portion in the axial direction and one side of the second support portion in the axial direction. The valve body has a first support target portion which is supported by the first support portion, a second support target portion which is supported by the second support portion, and a valve body barrel portion which is provided on the other side of the first support target portion in the axial direction and one side of the second support target portion in the axial direction. An inner circumference of the second support portion has a smaller diameter than an inner circumference of the tubular barrel portion. The first support target portion has a first stepped surface which extends outward in a radial direction in a boundary between the first stepped surface and the valve body barrel portion and is directed to the other side in the axial direction. The second support portion has a second stepped surface which extends inward in the radial direction in a boundary between the second stepped surface and the tubular barrel portion and is directed to one side in the axial direction. An end portion of the biasing member on one side in the axial direction comes into contact with the first stepped surface. An end portion of the biasing member on the other side in the axial direction comes into contact with the second stepped surface. The first support target portion receives a biasing force of the biasing member on the first stepped surface and moves to one side in the axial direction, such that the first opening is blocked. The first support target portion moves to the other side in the axial direction against a biasing force of the biasing member due to a negative pressure on the downstream side with respect to the upstream side, such that the first opening is opened. The first support target portion has a shape in which first contact portions whose end portions on an outward side in the radial direction come into contact with the first support portion and first separation portions whose end portions on the outward side in the radial direction are separated from the first support portion are alternately disposed in a circumferential direction. The second support target portion has a shape in which second contact portions whose end portions on the outward side in the radial direction come into contact with the second support portion and second separation portions whose end portions on the outward side in the radial direction are separated from the second support portion are alternately disposed in the circumferential direction.

According to the first exemplary disclosure of this application, it is possible to actively recirculate a large amount of blowby gas in a situation where a negative pressure on an entrance side is low without increasing the size of a recirculation valve.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A recirculation valve disposed on a blowby gas path to recirculate blowby gas of an internal combustion engine to a suction side, the recirculation valve comprising:
   a housing that has a tubular portion including a penetration hole that penetrates the tubular portion in a direction parallel or substantially parallel to a central axis;
   a valve body that is movable in the penetration hole in an axial direction; and
   a biasing member that biases the valve body to one side in the axial direction; wherein
   the tubular portion includes:
      a first opening that opens on one side of the penetration hole in the axial direction and is connected to an upstream side of the blowby gas path;
      a second opening that opens on the other side of the penetration hole in the axial direction and is connected to a downstream side of the blowby gas path;
      a first support portion that supports the valve body on the one side of the penetration hole in the axial direction;
      a second support portion that supports the valve body on the other side of the penetration hole in the axial direction; and
      a tubular barrel portion provided on the other side of the first support portion in the axial direction and one side of the second support portion in the axial direction; wherein
   the valve body includes:
      a first support target portion supported by the first support portion;
      a second support target portion supported by the second support portion; and
      a valve body barrel portion provided on the other side of the first support target portion in the axial direction and one side of the second support target portion in the axial direction;
   an inner circumference of the second support portion has a smaller diameter than an inner circumference of the tubular barrel portion;
   the first support target portion includes a first stepped surface extending outward in a radial direction in a boundary between the first stepped surface and the valve body barrel portion and is directed to the other side in the axial direction;
   the second support portion includes a second stepped surface extending inward in the radial direction in a boundary between the second stepped surface and the tubular barrel portion and is directed to one side in the axial direction;
   an end portion of the biasing member on one side in the axial direction is movable to contact with the first stepped surface;
   an end portion of the biasing member on the other side in the axial direction is movable to contact with the second stepped surface;

the first support target portion receives a biasing force of the biasing member on the first stepped surface and moves to one side in the axial direction, such that the first opening is blocked;

the first support target portion moves to the other side in the axial direction against a biasing force of the biasing member due to a negative pressure on the downstream side with respect to the upstream side, such that the first opening is opened;

the first support target portion has a shape in which first contact portions whose end portions on an outward side in the radial direction come into contact with the first support portion and first separation portions whose end portions on the side outward side in the radial direction are separated from the first support portion are alternately disposed in a circumferential direction; and the second support target portion has a shape in which second contact portions whose end portions on the outward side in the radial direction come into contact with the second support portion and second separation portions whose end portions on the outward side in the radial direction are separated from the second support portion are alternately disposed in the circumferential direction.

2. The recirculation valve according to claim 1, wherein the end portions of the second contact portions on the outward side in the radial direction are positioned on the outward side in the radial direction from an end portion of the valve body barrel portion on the outward side in the radial direction.

3. The recirculation valve according to claim 1, wherein the first support target portion and the valve body barrel portion are separate members; and the second support target portion and the valve body barrel portion are separate members.

4. The recirculation valve according to claim 2, wherein the first support target portion and the valve body barrel portion are separate members; and the second support target portion and the valve body barrel portion are separate members.

5. The recirculation valve according to claim 1, wherein an outer diameter of the second support target portion is the same diameter as an outer diameter of the valve body barrel portion.

6. The recirculation valve according to claim 5, wherein the second separation portion includes a tapered portion extending to the other end side in the axial direction and inward in the radial direction from the valve body barrel portion.

7. The recirculation valve according to claim 1, wherein the second support target portion includes the three second contact portions in the circumferential direction.

8. The recirculation valve according to claim 2, wherein the second support target portion includes the three second contact portions in the circumferential direction.

9. The recirculation valve according to claim 3, wherein the second support target portion includes the three second contact portions in the circumferential direction.

10. The recirculation valve according to claim 5, wherein the second support target portion includes the three second contact portions in the circumferential direction.

11. The recirculation valve according to claim 6, wherein the second support target portion includes the three second contact portions in the circumferential direction.

12. The recirculation valve according to claim 1, wherein the first support target portion includes the three first contact portions in the circumferential direction.

13. The recirculation valve according to claim 2, wherein the first support target portion includes the three first contact portions in the circumferential direction.

14. The recirculation valve according to claim 1, wherein a number of first contact portions is the same as a number of second contact portions; and positions of the first contact portions in the circumferential direction are the same positions as positions of the second contact portions in the circumferential direction.

15. The recirculation valve according to claim 2, wherein a number of first contact portions is the same as a number of second contact portions; and positions of the first contact portions in the circumferential direction are the same positions as positions of the second contact portions in the circumferential direction.

16. The recirculation valve according to claim 5, wherein a number of first contact portions is the same as a number of second contact portions; and positions of the first contact portions in the circumferential direction are the same positions as positions of the second contact portions in the circumferential direction.

* * * * *